(12) United States Patent
Fargier

(10) Patent No.: US 11,063,900 B2
(45) Date of Patent: Jul. 13, 2021

(54) METHOD FOR COMMUNICATING BETWEEN COMMUNICATING ELEMENTS FORMING PART OF A HOME AUTOMATION SYSTEM

(71) Applicant: SOMFY ACTIVITES SA, Cluses (FR)

(72) Inventor: Sylvain Fargier, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 0 days.

(21) Appl. No.: 16/644,020

(22) PCT Filed: Sep. 3, 2018

(86) PCT No.: PCT/EP2018/073585
§ 371 (c)(1),
(2) Date: Mar. 3, 2020

(87) PCT Pub. No.: WO2019/043218
PCT Pub. Date: Mar. 7, 2019

(65) Prior Publication Data
US 2020/0252368 A1    Aug. 6, 2020

(30) Foreign Application Priority Data

Sep. 4, 2017 (FR) ...................................... 1758150

(51) Int. Cl.
*H04L 29/12* (2006.01)
*H04L 12/26* (2006.01)
*H04L 12/28* (2006.01)

(52) U.S. Cl.
CPC ...... *H04L 61/2076* (2013.01); *H04L 12/2838* (2013.01); *H04L 61/6059* (2013.01)

(58) Field of Classification Search
CPC ............ H04L 61/2007; H04L 61/2076; H04L 61/2084; H04L 61/6059; H04L 12/2838
See application file for complete search history.

(56) References Cited

U.S. PATENT DOCUMENTS

2009/0147699 A1\* 6/2009 Ruy .................. H04L 29/12301
370/254

OTHER PUBLICATIONS

L. Brilli, T. Pecorella, L. Pierucci and R. Fantacci, "A Novel 6LoWPAN-ND Extension to Enhance Privacy in IEEE 802.15.4 Networks," 2016 IEEE Global Communications Conference (GLOBECOM), Washington, DC, 2016, pp. 1-6 (Year: 2016).\*

(Continued)

*Primary Examiner* — John M MacIlwinen
(74) *Attorney, Agent, or Firm* — Nixon & Vanderhye

(57) ABSTRACT

Disclosed is a method for communicating between communicating elements forming part of a home automation system for a building, each communicating element being connected in a communication network allowing communication according to a predefined communication protocol. Each communicating element of the communication network stores a current network address in a memory of the communicating element, the current network address being used for point-to-point addressing in the communication network, and each communicating element stores at least one preceding network address of the communicating element in the memory of the communicating element.

15 Claims, 4 Drawing Sheets

(56) References Cited

OTHER PUBLICATIONS

V. Prevelakis and S. Ioannidis. Preserving TCP connections across host address changes. In Proceedings of the 9th international conference on Information Security (ISC'06). Springer-Verlag, Berlin, Heidelberg, 2006. pp. 299-310 (Year: 2006).*
S. Thomson, T. Narten, T. Jimei. IPv6 Stateless Address Autoconfiguration. RFC 4862. Sep. 2007. pp. 1-30 (Year: 2007).*
International Search Report, PCT/EP2018/073585, dated Oct. 30, 2018.
S. Thomson et al: II I Pv6 Stateless Address Autoconfiguration; rfc4862.txt, Sep. 1, 2007 (Sep. 1, 2007), pp. 1-30, XP055265358, Retrieved from the Internet: URL:https://tools.ietf.org/pdf/rfc4862.pdf [retrieved on Apr. 14, 2016] paragraph [5.2.auto.configuration.related.structure] paragraph [5.4.Duplicate.Address.Detection].
Narten IBM Corporation R Draves Microsoft Research S Krishnan Ericsson Research T: "Privacy Extensions for Stateless Address Autoconfiguration in IPv6; rfc4941.txt", Privacy Extensions for Stateless Address Autoconfiguration in IPV6; RFC4941.TXT, Internet Engineering Task Force, IETF; Sep. 1, 2007 (Sep. 1, 2007).
Narten IBM E Nordmark Sun Microsystems W Simpson Daydreamer H Soliman Elevate Technologies T: "Neighbor Discovery for IP version 6 (IPv6); rfc4861.txt",Neighbor Discovery for IP Version 6 (IPV6)?; RFC4861.TXT, Internet Engineering Task Force, IETF; Sep. 1, 2007, XP015052407.
French Search Report, FR 1758150, dated Apr. 24, 2018.

* cited by examiner

METHOD FOR COMMUNICATING BETWEEN COMMUNICATING ELEMENTS FORMING PART OF A HOME AUTOMATION SYSTEM

BACKGROUND OF THE INVENTION

Field of the Invention

The present invention relates to a communication method for communicating between communicating elements forming part of a home automation system for a building, as well as a communicating element forming part of an associated home automation system, and an associated home automation system.

The invention is positioned in the field of home automation for buildings, whether individual or collective, for commercial, industrial or residential use.

Description of the Related Art

Home automation, or "Building Automation Systems", relates to equipment units for buildings with remotely controllable automation systems, designed to ensure performance of security, comfort or energy management functions. These include, for example, the control of heating and air conditioning systems, the remote actuation and operation of blinds or roller shutters, or remote arming of security systems by control-monitoring of closure and locking systems.

Typically, the equipment component units of a same given building are connected to a control unit, which has the function of supervising these equipment units and controlling the operation thereof. This connection is often implemented by connecting the equipment units, by means of wired links, to a common data bus, such as a multipoint bus that allows a bidirectional connection, for example of the RS485 type. This data bus is connected to the control unit, in a manner so as to form a network which permits the exchange of data between the equipment units and the control unit.

However, such a situation has drawbacks.

On the one hand, it offers limited flexibility, since any modification after installation requires rewiring the network, whether for purposes of adding new equipment units or to modify the distribution thereof within the building. This entails the need to carry out work that can be long and costly and requiring the intervention of specialised technicians.

On the other hand, this known situation presents limits in terms of the number of devices that can be accommodated on the network. For example, the RS485 type solutions currently used have limited addressing capacities, for example allowing for the possibility to connect a maximum of 255 devices on a same given bus. This limit is prohibitive when it comes to equipping large buildings and/or buildings comprising a large number of equipment units to be managed. However, contemporary applications make it necessary to be able to manage a large number of equipment units and devices, for example in the context of the Internet of Things.

In addition, the architecture of these known networks can lead to the appearance of high latency times during communication between an equipment unit and the control unit. This is explained in particular by the fact that the control-command is centralised and that the information sent by the equipment units must revert back to the bus in order to be processed by the control unit. However, for certain applications, a latency time which is too high can be detrimental to the proper functioning of the equipment units.

In order to overcome these drawbacks, it is proposed to improve the home automation system by adding a communication network architecture, preferably hierarchical, thereby making it possible to manage a large number of equipment units and devices, each equipment unit being a communicating element of the home automation system, while also presenting significantly increased flexibility with respect to installation and modification.

The communicating elements of the home automation system become nodes of the network, each having a network address that allows for communication in the hierarchical network. The system comprises a main network of a higher hierarchical level, and one or more sub-networks of lower hierarchical levels, connected by means of network equipment units, gateways or routers.

In a home automation system, certain equipment units must be replaced or moved, for example for reasons of maintenance or modernisation.

When home automation equipment units are connected as communicating elements of a communication network, any change or movement of home automation equipment units results in a change in the communication network. In particular, it is necessary to provide a new network address to a communicating element which has been moved or to a new communicating element. In order to do this, many communications between various network equipment units are necessary, which can induce an overload of network traffic. A reconfiguration of one or more communicating elements is also necessary to be undertaken manually.

The object of the invention is to remedy all or part of the aforementioned drawbacks, by proposing a simplified communication mechanism in the event of a modification of the connection or change.

SUMMARY OF THE INVENTION

To this end, the invention relates to a communication method for communicating between communicating elements forming part of a home automation system for a building, with each communicating element being connected in a communication network that supports communication according to a predefined communication protocol. Each communicating element of the communication network memorizes a current network address in a memory storage of the communicating element, the current network address being used for point-to-point addressing in the communication network, and each communicating element implements the memorizing of at least one previous network address of the communicating element, in the memory storage of the communicating element.

Advantageously, the invention makes it possible, by memorizing at least one previous address, to facilitate the operation of the communication network.

The communication method according to the invention may also have one or more of the characteristic features here below, taken into consideration independently or in accordance with all the technically acceptable combinations thereof.

The method includes the memorizing of a predetermined number P of previous addresses, P representing a non-zero integer.

The method further also includes the following steps that are operationally implemented by at least one communicating element: updating of the current network address; and effectively implementing an announcement of change of network address by transmission of a message comprising at least the current network address and at least one previous network address of the communicating element.

The method includes the sending, by a requesting communicating element, of a request for identification of another communicating element of the network by a previous network address of the other communicating element, in a message to be forwarded to a group of recipients to which a plurality of communicating elements are subscribed, the message containing at least one previous network address of the other communicating element.

The method includes, upon receipt of the identification request by a previous network address, the steps, implemented by at least one receiving communicating element belonging to the group of recipients, consisting of: comparison of the predetermined network address with each previous network address memorized by the receiving communicating element, and, when the comparison is positive, and sending to the requesting communicating element a response message containing at least the current network address of the receiving communicating element.

The method includes the sending, by a requesting communicating element, of a request for discovery of the previous network addresses, in a message to be forwarded to a group of recipients to which a plurality of communicating elements are subscribed.

The method includes a step, effectively implemented by each of the communicating elements subscribed to the group of recipients, consisting of: sending of a response message comprising at least one previous address of the communicating element, to be forwarded to all the communicating elements subscribed to the group of recipients.

The communication protocol is the Internet Protocol version 6 (IPv6).

According to another aspect, the invention relates to a communicating element forming part of a home automation system for a building, which is adapted so as to be connected in a communication network that supports communication according to a predefined communication protocol. This communicating element includes a network interface, comprising a memory storage adapted so as to memorize a current network address of the communicating element, used for point-to-point addressing in the communication network, and a table adapted so as to memorize at least one previous network address of the communicating element.

According to a particular characteristic feature, the communicating element in addition includes a network controller, comprising a processor that is capable of operationally implementing the program code instructions to be used in order to execute the steps of the communication method as briefly described here above.

According to another aspect, the invention relates to a home automation system for a building comprising a plurality of communicating elements as briefly described here above, with each communicating element being connected in a communication network that supports communication according to a predefined communication protocol, in which each communicating element is capable of operationally implementing a communication method as briefly described here above.

BRIEF DESCRIPTION OF THE DRAWINGS

Other characteristic features and advantages of the invention will emerge from the description which is given here below, purely by way of information and without limitation, with reference made to the appended figures, among which.

DETAILED DESCRIPTION OF EMBODIMENTS

The invention will be described more particularly in the context of its application in a home automation system as described here below with reference to FIGS. 1 and 2, in which the communication network is hierarchical. However, the invention is not limited to this embodiment, and is also applicable in an analogous manner in a communication network which does not have an architecture with several hierarchical levels.

Figure 1:
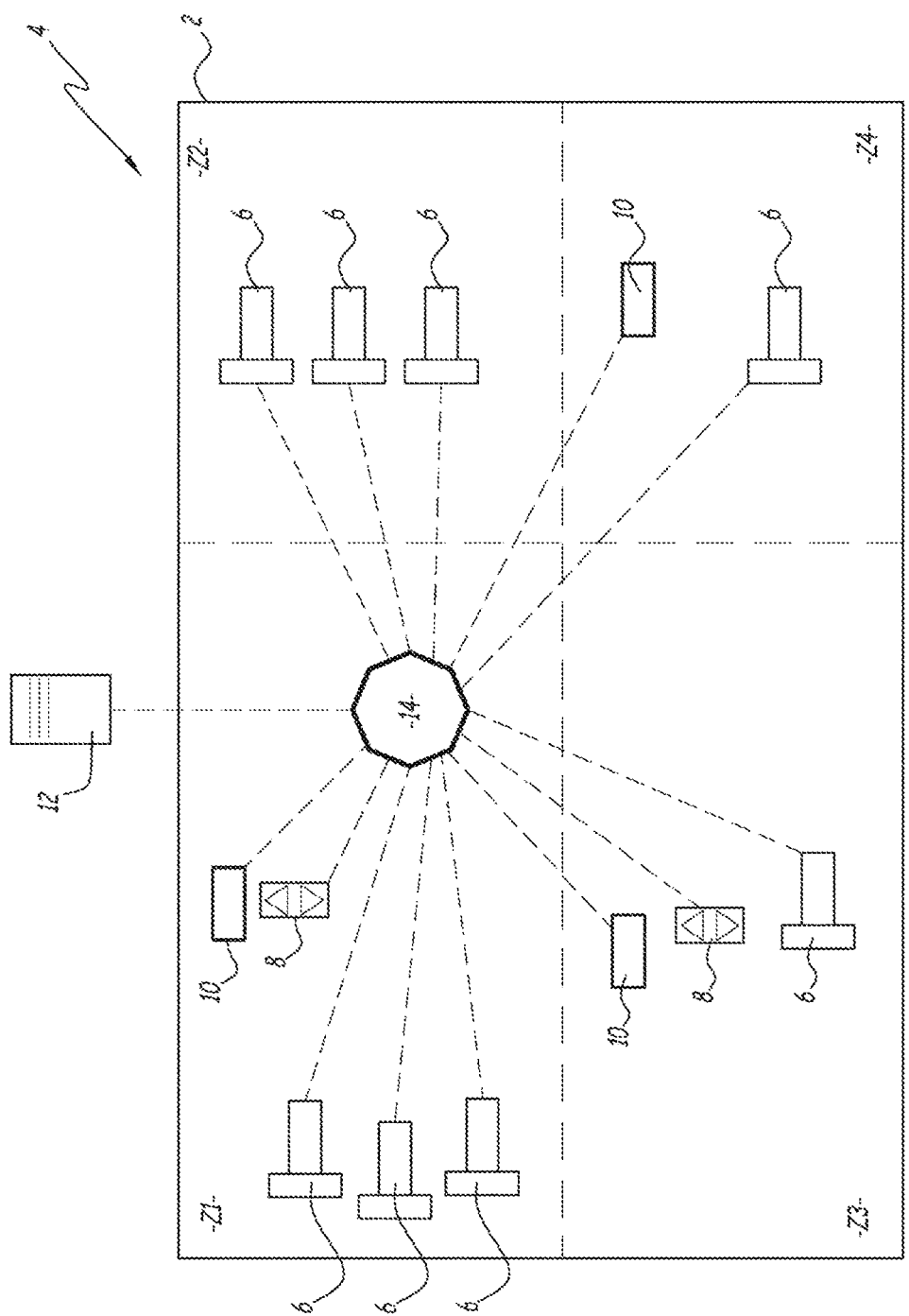
FIG. 1 is a schematic representation of a building comprising a home automation system according to one embodiment of the invention.

FIG. 1 represents a building 2, comprising of a plurality of zones Z1, Z2, Z3, Z4. The building 2 is equipped with a home automation system 4 which includes a set of home automation equipment units distributed in the zones of the building 2, as well as a control system for these home automation equipment units.

The home automation system 4 in this case is designed to enable and ensure the comfort and/or energy management functions of the building 2, such as heating, ventilation and air conditioning, as well as the functions of lighting management, control of the opening elements, such as blinds or roller shutters placed in front of the windows in the building 2, and/or security functions such as surveillance of the premises and the alarm system.

The set of home automation equipment units includes home automation equipment units such as controllable home automation devices 6, control points 8 and sensors 10.

The control system comprises in particular a programmable control unit 12 and a communication network 14, which is internal to the building 2, the communication network 14 being arranged so as to support the communication of the home automation equipment units of the home automation system 4 with the control unit 12. The home automation equipment units of the home automation system 4 which are connected to this communication network 14 are, in the sections that follow, said to belong to the communication network 14.

The home automation equipment units and the control system in this case are connected to one or more sources of electrical power, not illustrated, in the building 2.

The zones of the building 2 correspond to spatial portions of the building 2 which are located within the interior and/or on the exterior of this building and which are intended to each accommodate a portion of the home automation equipment units of the home automation system 4.

For example, the zones of the building 2 correspond to the levels of the building 2, such as floors or basements or below-ground levels. These zones may also be rooms, groups of rooms in the building 2, possibly separated from each other by partitions, these rooms may be distributed within one or more levels of the building 2. These zones may also correspond to facades or parts of a facade like a part of a facade corresponding to a same given floor.

These zones are for example defined during the designing of the building 2 and/or during the designing and/or installation of the home automation system 4.

Preferably, the zones of the building 2 are distinct and separate from each other. However, by way of a variant, the zones of the building 2 may overlap and/or be nested within each other.

The building 2 may be an office complex, or a building for residential use, or a building for commercial or industrial use, or any combination of these uses. It may in particular be a stand-alone building or a detached house.

Thus, within the meaning of the present description, the term "home automation" is not limited to a purely domestic and residential use.

In this example, only four zones, here denoted as Z1, Z2, Z3 and Z4, are defined with reference to the building 2. However, in practice, this number may be different. It is in particular adapted according to the configuration of the building 2 and the functions of the home automation system 4.

In order to simplify FIG. 1, the zones Z1, Z2, Z3 and Z4 are illustrated schematically within the interior of a same given floor of the building 2.

Preferably, each controllable home automation device 6 comprises a controllable actuator that may be controlled by means of at least one control signal.

The controllable home automation devices 6 in this case are illustrated in an identical manner. However, there may exist differences among them and they may perform different functions within the home automation system 4.

For example, the actuator of the controllable home automation device 6 comprises an electric motor coupled with a mechanical load and arranged so as to move and/or adjust or regulate an element of the building 2.

According to one example, the mechanical load of the controllable home automation device 6 is a blackout shutter system, such as a panel, a blind or an opaque curtain, associated with at least one opening of the building 2, such as a window or a bay window. The movement of this blackout shutter system makes it possible to regulate the amount of sun light received by the building 2 through this opening.

According to another example, the mechanical load of the controllable home automation device 6 is a compressor that is capable of setting in operation an expansion-compression cycle of a heat-transfer fluid within a cooling system of the building 2, such as an air conditioner or a heat pump, in order to regulate the temperature within the interior of the building 2.

According to yet another example, the mechanical load of the controllable home automation device 6 is a pump or a fan intended to set in motion a volume of fluid within the building 2, for example for suctioning or blowing of air within a ventilation system, or for circulating water or a heat transfer fluid within a dedicated pipe.

By way of a variant, the actuator of the controllable home automation device 6 is able to operationally control an electrical switching device, in order to control the switching on and off of a light source, such as an array of neon or light-emitting diode lights and lamps, within the building 2.

The controllable home automation device 6 may also be lighting, for example, interior or exterior lighting or a lighting control system, an alarm system, or even a video camera, in particular a video surveillance camera.

Each control point 8 is intended to receive operational control instructions from a user of the building 2, with a view to controlling operation, directly or indirectly, of one or more of the controllable home automation devices 6 and/or for controlling operation of the control unit 12.

To this end, each control point 8 here includes a human-machine interface, not illustrated, comprising data input means, such as one or more switches and/or one or more push buttons and/or one or more rotary buttons and/or a tactile touch screen. The control point 8 may also include a connection interface for connecting thereto the external control means, for example one or more individual switches arranged around the control point 8 and being connected by a wired link to this control point 8.

The control points 8 may be in the form of a portable remote control associated with a fixed receiver or, by way of a variant, a fixed control terminal integrally secured to a wall of the building 2.

Each sensor 10 is designed to convert one or more physical quantities relating to the state of the building 2 or of its environment into one or more signals that are proportional to this physical quantity. This signal is, for example, an electrical signal, a light signal or a radio frequency signal. This signal may be transmitted by the sensor to be received by at least one home automation equipment unit and/or the control system, for example, the control unit 12.

One or more sensors 10, may be integrated into a controllable home automation device 6, into a control point 8, or even into the control unit 12. The home automation system 4 may also include one or more sensors that are independent of these elements.

For example, the physical quantities measured by the sensors 10 are, without limitation, a temperature, for example a temperature of a wall or of the ambient air, a humidity rate, a luminosity value, a value of ambient air pressure, a value of consumption for example of water, gas or electricity, the state of opening of a roller shutter, the position of an opening element such as a window, whether or not motorized, or even the presence or absence of a user.

By way of an illustrative example, in FIG. 1, the zone Z1 comprises three controllable home automation devices 6, one control point 8 and one sensor 10. The zone Z2 comprises three controllable home automation devices 6. The zone Z3 comprises one controllable home automation device 6, one control point 8 and one sensor 10. The zone Z4 comprises one controllable home automation device 6 and one sensor 10.

Each home automation equipment unit of the home automation system 4, including in particular the controllable home automation devices 6, the control points 8, and the sensors 10, is connected to the control unit 12 by means of the communication network 14 and for this purpose comprises a network interface 40, described here below with reference to FIG. 4, for connecting to this communication network 14 The control unit 12 also includes a network interface 40.

The function performed by the network interface of a communicating element is to connect this communicating element to one or more communication networks. It thus enables the communicating element to communicate with the other communicating elements of the one or more network/s to which it is connected.

For example, each controllable home automation device 6 receives the control signals via the communication network 14. Each control point 8 transmits the operational control instructions received via the communication network 14. Each sensor 10 sends the measured information items via the communication network 14.

The communication takes place according to a given communication protocol.

For example, the communication takes place by an exchange of messages, for example in the form of packets, with these messages each containing a header, which includes a destination-recipient of the message, and useful data items, such as a command order or a value of a physical quantity measured by a sensor.

Preferably, the communication protocol used is an IP protocol ("Internet Protocol"), for example the IPv6 protocol. More generally, the invention is applicable to any Internet Protocol version 6/Internet Control Message Protocol version 6 (IPv6/ICMPv6 protocol).

Figure 2:
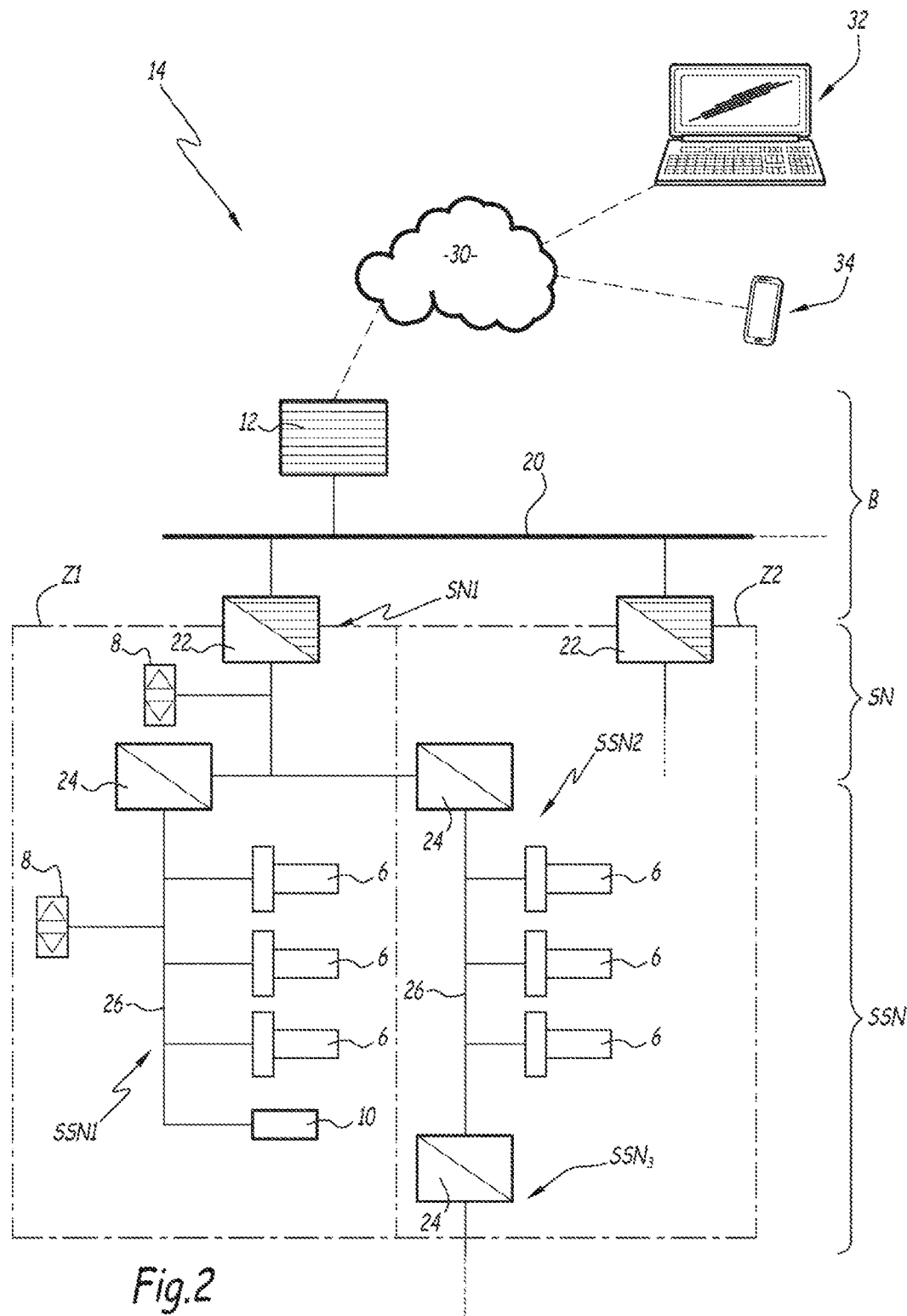
FIG. 2 is a schematic representation of a hierarchical communication network for connecting the equipment units and devices of a home automation system in one embodiment.

FIG. 2 represents in greater detail the example of the communication network 14 shown in FIG. 1. In order to facilitate the reading of this FIG. 2, the home automation devices 6, 8, 10 associated with the zones Z3 and Z4 of the building 2 are not illustrated therein.

The communication network 14 is a hierarchical network having several hierarchical levels, also referred to as rank. It includes a main network B, which in particular comprises a common data bus, forming a back-end physical link 20, also referred to as a "backbone" per the accepted terminology, to which the control unit 12 is connected.

For example, the backbone or back-end physical link 20 is a wired link of the Ethernet type (IEEE 802.3 standard), for example Ethernet 100 Mbit/s or higher.

The communication network 14 also comprises at least one sub-network (or subnet), generically denoted by the reference SN. This sub-network includes a network equipment unit 22, 24, which is directly connected to the backbone link 20 by means of a network interface 40 and which forms the head-end of this sub-network SN. It may be an interconnecting network equipment unit, also referred to as gateway 22, intended to interconnect two parts of separate and distinct networks, for example, based on different technologies. It may also be a router 24 when the main network B and the sub-network SN are identical in nature.

The term 'router' refers to a hardware and software tool that forms an intermediate element in a network and directs the data, for example in the form of data packets, between one and more parts of the network. The direction provided to the data, or routing, is carried out in accordance with a set of rules that make up a routing table.

The term 'gateway' refers to a particular router, which in addition to routing functions, also has the function of translating the messages circulating over the network, insofar as the physical means and/or the protocols differ between two parts of the network.

In other words, the network equipment units router and gateway fulfill the role of enabling the passing through of the data packets transiting from one network interface 40 to another in accordance with a set of rules that make up a routing table.

In the example shown in FIG. 2, two gateways 22 are connected to the backbone link 20, thereby forming two separate sub-networks SN1 and SN2. Only one of these two sub-networks, bearing the reference SN1, is described in the following.

By way of a variant, the number of sub-networks SN may be different.

The sub-networks SN are directly connected to the main network via gateways, and have an associated first rank in the hierarchical network.

Each sub-network SN contains at least one home automation equipment unit 6, 8, 10 of the home automation system 4, connected to the corresponding gateway 22 via a physical link 26, preferably wired.

The communication network 14 in addition includes sub-sub-networks (or sub-subnets) having a rank lower than that of the sub-networks SN, and are denoted in a generic way by the reference SSN.

Each sub-sub-network SSN includes a network equipment unit, advantageously a router 24, that connects it to a sub-network SN or to a sub-sub-network having a hierarchical level higher than its own. The network equipment unit 22, 24 forms the head-end of this sub-sub-network SSN.

With reference to the example in FIG. 2, if a rank "n" is associated with the sub-network SN1, each sub-sub-network SSN1 and SSN2 has an associated rank "n−1", and the sub-sub-network SSN3 has a rank "n−2".

Each head-end router 24 of sub-sub-network of rank "n−1" is connected to a gateway 22 via a physical link 26, preferably wired.

When the communication network 14 has several hierarchical levels, each head-end network equipment unit 22, 24 of sub-sub-network of rank "n−k", with k greater than or equal to 2, is connected to a router 24 of higher rank "n−k+1", via a physical link 26, preferably wired.

In one embodiment, the hierarchical network may include up to twelve hierarchical levels, including the level of the main network B.

Each sub-sub-network SSN comprises one or more home automation devices 6, 8, 10, connected to the corresponding router 24 via a physical link 26, with each home automation unit being connected to the physical link 26 by means of their respective network interfaces 40. Home automation equipment units connected, via a same given physical link 26, to a same given router 24 is in this case said to be part of a same given local sub-network.

Preferably, the sub-networks SN and each sub-sub-network SSN having a rank lower than that of the sub-network SN are each associated with a zone of the building 2.

A sub-network SN and/or a sub-sub-network SSN is said to be "associated" with a zone Z1, Z2, Z3, Z4 of the building 2 when the home automation devices 6, 8, 10 belonging to this sub-network are themselves associated with this zone, for example because they are physically located within the interior of this zone Z1, Z2, Z3, Z4 of the building 2.

The number and structure of the sub-networks SN and the sub-sub-networks SSN, as well as their association with the zones of the building 2, are preferably chosen according to the configuration of the building 2 and the functionalities fulfilled by the home automation system 4.

Preferably, the physical link 26 which connects each network equipment units 22, 24 to each other and which connects them to the home automation devices 6, 8, 10 is an RS485 type multipoint serial data bus.

The use of a physical link 26 of RS485 type presents advantages in this communication network 14, because it makes it possible to use very long data buses, for example 1 km long, without too significantly degrading the quality of the signal that circulates therein. Limiting the number of home automation devices 6, 8, 10 and/or network equipment units 22, 24 connected on a same given physical link 26 does not have a penalising effect, thanks to the hierarchical architecture which makes it possible to connect a large number of sub-networks.

In FIG. 2, the gateways 22 are network equipment units for interconnection between an Ethernet data bus and an RS485 bus.

On an optional basis, the control unit 12 is adapted so as to be connected to an external data network 30, such as the internet network, independently of the communication network 14.

In this way, the control unit 12 can communicate with a remote computer server connected to this external network 30, for example in order to send reports on the operating state of the home automation system 4 for diagnostic purposes, or even to receive operational control instructions. The control unit 12 can also communicate via the external network 30 with one or more remote users, for example, who are provided with a communication terminal such as a computer 32, an intelligent mobile telephone device, that is to say "smartphones", a touchscreen tablet or other any equivalent equipment units.

The communication network 14 is adapted so as to operate according to a predefined communication protocol, such as the IP protocol, in order to ensure communication between the communicating elements of the home automation system 4 which are connected to this communication network 14.

In the preferred embodiment, the communication protocol used is IPv6.

This communication protocol is operationally implemented here by making use of the network interfaces 40 which equip the various home automation devices 6, 8, 10 and network equipment units 22, 24 of the home automation system 4 which are connected by the communication network 14, in particular thanks to their network interface 40.

Subsequently, the generic term "communicating element" will be understood to refer to the network equipment units 22, 24 and the home automation devices 6, 8, 10.

The routers 24 and the one or more gateway/s 22 comprise specific network interfaces. For example, these network interfaces each implement a protocol stack, that is to say a stack of protocol layers, each protocol layer relying on those below it in order to provide additional functionality.

Figure 3:
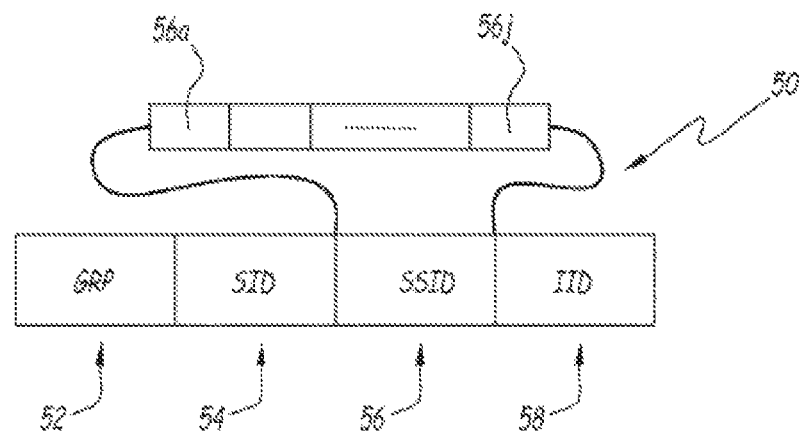
FIG. 3 is a schematic representation of an example of network address structure for identifying the communicating elements according to a communication protocol.

FIG. 3 schematically shows an example of network address of the type point to point ("unicast" as per the accepted terminology) that provides the ability to define in a unique manner a communicating element.

The network address 50 comprises several address fields respectively referenced as 52, 54, 56 and 58, the address fields corresponding to different and successive hierarchical levels of the hierarchical communication network 14. The address field referenced 52 contains a site prefix GRP for "Global Routing Prefix", which identifies the communication network 14 as a whole. Typically, a single unique site prefix GRP is assigned to the home automation system 4 of a building 2.

The site prefix GRP is preconfigured manually in all the network equipment units 22, 24 intended to be connected on the backbone link 20. It may be memorized in a memory storage of the network equipment units 22, 24. The site prefix GRP can only be modified manually. It corresponds to the highest hierarchical level in the communication network 14.

The address field referenced 54 contains an identifier for the sub-network SID for "Sub-net IDentifier", which identifies the sub-network SN having a rank n, n being a non-zero integer, to which the communicating element considered belongs. Each sub-network SN connected to the backbone link 20 corresponds to a different SID sub-network identifier.

The address field referenced 56 contains an identifier for the sub-sub-network SSID for "Sub-Subnet IDentifier", which identifies the sub-sub-network SSN having a rank lower than n to which the communicating element considered belongs.

Finally, the address field 58 contains an identifier for the interface IID for "Interface IDentifier", corresponding to the unique identifier of the network interface 40 of the communicating element considered. In one embodiment, it is the MAC address which uniquely identifies each network interface 40 of a communicating element. This identifier is assigned to the network interface 40 at the time of its manufacture. It can for example be memorized in a memory storage 44 of the network interface 40. According to another embodiment, the address field 58 corresponding to the interface identifier IID may be entered at the time of the manufacture of the network interface.

When the communication protocol used is the IPv6, the network address 50 of a communicating element 6, 8, 10, 22, 24 comprises a total of 128 bits, that is to say 16 bytes. For example, the number of bytes allocated to each of the address fields 52, 54, 56 and 58 is 48 bits, 16 bits, 40 bits, and 24 bits, respectively.

In addition, the address field 56 corresponding to the sub-sub-networks is typically divided into address subfields 56a to 56j, making it possible to identify several layers of sub-sub-networks. Each addressing subfield corresponds to a different hierarchical level of the sub-sub-network SSN. According to one embodiment, the address field 56 corresponding to the sub-sub-networks may include ten address sub-fields.

When the communication protocol used is the Internet Protocol version 4 IPv4, the network address has a total of 32 bits, that is to say 4 bytes.

A network address 50 is completely configured when the different address fields 52, 54, 56 and 58 are filled in, according to the hierarchical level of the sub-network to which the communicating element considered belongs.

Each communicating element memorizes its current network address 50, used for addressing the communicating element, in particular in point-to-point communication, between a source communicating element and a destination-receiving communicating element.

In addition, advantageously, each communicating element memorizes a predetermined number P of previous network addresses, P representing a non-zero integer. For example, P=5.

A previous network address is a network address used during a previous connection, prior to a disconnection/reconnection.

Thus, in the event of movement with disconnection and reconnection of a same given home automation equipment unit within the system, this equipment unit stores in the memory storage one or more previous network addresses.

Figure 4:
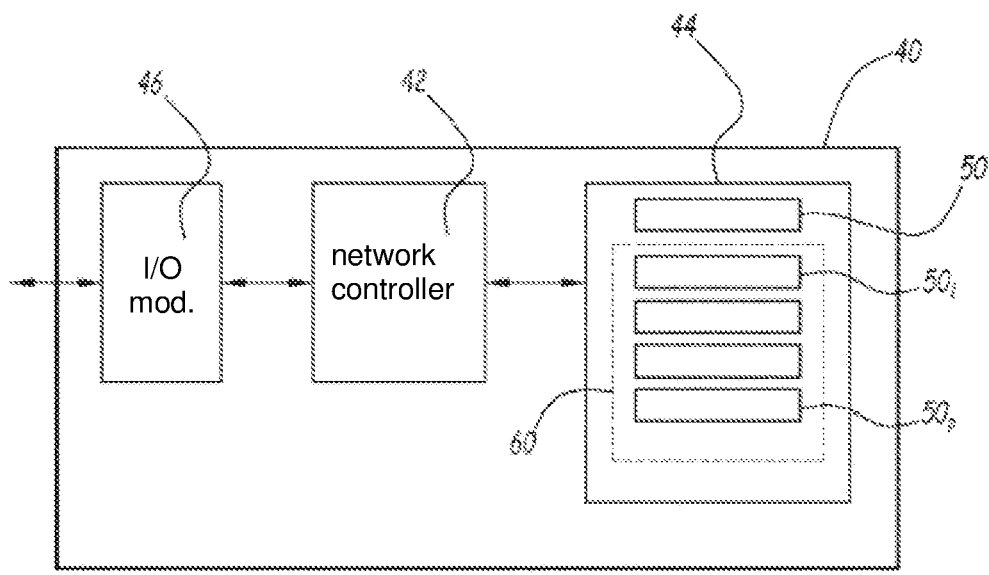
FIG. 4 is a schematic representation of a network interface for a home automation equipment unit belonging to the communication network shown in FIG. 2.

FIG. 4 schematically illustrates a network interface 40 of a communicating element in one embodiment.

The network interface 40 includes a network controller 42, a memory storage 44 and an input-output module 46, also referred to as a "transceiver" as per the accepted terminology, this module 46 being here provided with a connector which physically connects it to a physical layer of the network 14.

In this example, the physical layer of the network 14 is partly formed by the links 26.

The controller 42 includes an electronic computer, for example a data processor, programmed so as to perform the processing of the data passing through the network 14 and through the input-output module 46.

For example, the controller 42 is programmed so as to automatically process the data received on the input-output module 46 and being forwarded to it, in particular for extracting and decoding the content of received packets and for transmitting this content to the home automation equipment units with which it is associated.

Additionally, in a complementary fashion, the controller 42 is programmed so as to automatically prepare the data sent by the home automation equipment units with which it is associated, with a view to sending it to one or more home automation equipment units connected to the network 14.

Finally, the controller 42 is capable of operationally implementing the programme code instructions to be used in order to execute the steps of the communication method according to the invention. The memory storage 44 advantageously contains executable code instructions for ensuring the performance of the previously described operation of the controller 42.

In addition, the memory storage 44 in this case contains a network address 50, or current network address, which in a unique fashion identifies the network interface 40 on the communication network 14 and which therefore identifies the corresponding communicating element 6, 8, 10, 22, 24 on the communication network 14.

In addition, according to one embodiment of the invention, this memory storage 44 contains an address table 60 for memorizing the previous network addresses 501 to 50P, that is to say, the network addresses of the communicating element considered that are older than its current address 50. For example, a predetermined number P of locations is provided for, for memorizing P complete network addresses, P representing a non-zero integer.

It is understood that the previous network addresses are not necessarily filled in. Table 60 may contain any number between zero and P of previous addresses entered, P representing a non-zero integer.

The network interface 40 is for example compatible with the IPv6 standard. By way of a variant, it is compatible with the IPv4 standard.

Advantageously, the memorizing of previous network addresses makes it possible to simplify the communications in the communication network 14 when a communicating element is physically moved, for example, in order to be connected to another sub-network of a same given communication network 14 or when a communicating element is replaced, for example, following a failure of the latter or to replace it with a newer model.

Thus, for example, a control point 8 that has been in communication with an actuator 6, is able, when the actuator 6 is moved and reconnected in the communication network, to obtain both the current network address and the previous network address of the actuator 6, and update the previously memorized data in relation to the actuator 6.

Consequently, in the case at hand, the use of a previous address makes it possible to simplify communications by avoiding any need for collection of data following the movement of a home automation equipment unit.

Figure 5:
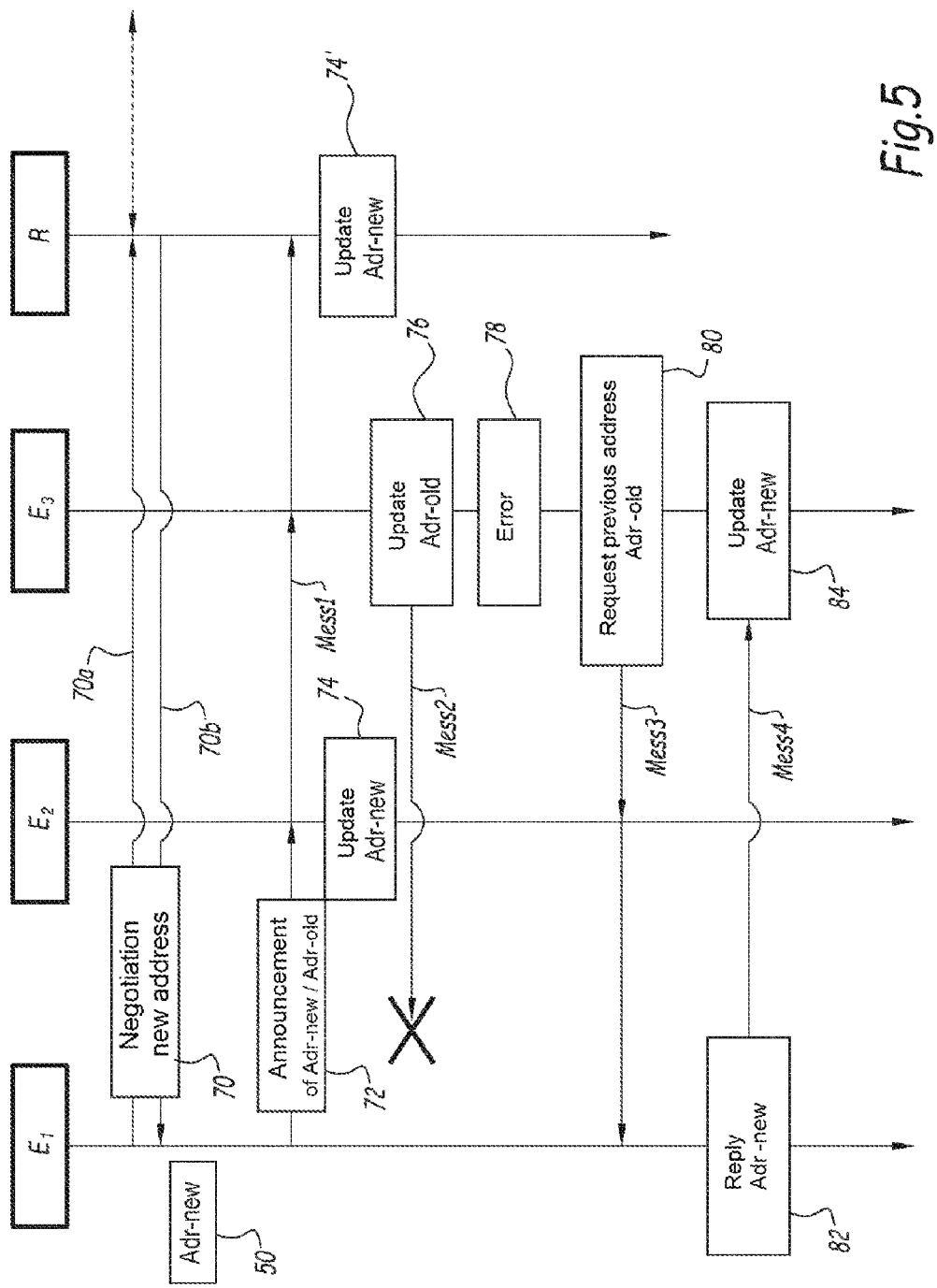
FIG. 5 is a flow chart that represents the main steps of a communication method according to one embodiment.

FIG. 5 is a flow chart illustrating a communication method that effectively implements the preceding network addresses memorized, in a usage scenario.

Illustrated schematically in FIG. 5 are the communications between a communicating element E1 which is moved and then reconnected to the communication network, two previously connected communicating elements E2 and E3, and a router R.

Considered in this example is a single previous network address Adr-old of the communicating element E1, memorized in a table 60, prior to the moving and reconnecting. The memorizing is done in a systematic manner. Each communicating element records its "current" address and will check to verify that it has not changed upon startup. If it has changed the communicating element will record it as a previous network address.

When being reconnected to the communication network 14, the communicating element E1 implements an updating step 70 of updating its current network address, which includes the negotiation of network identifiers. The negotiation of network identifiers includes the transmission of a request 70a by the communicating element E1 forwarded to the router R and the reception, by the communicating element E1, of a response 70b originating from the router R, after communication by the latter, with a network head-end not shown.

In the response 70b, the communicating element E1 receives the network identifiers and assigns a new network address Adr-new, formed based on the network identifiers received and its interface identifier IID. The network address Adr-new becomes its current network address and is memorized as the network address 50 in the memory storage 44.

Various different mechanisms may be used such as the use of a DHCP (for "Dynamic Host Configuration Protocol" as per the accepted terminology) or SLAAC (for "Stateless Address Auto Configuration" as per the accepted terminology).

Having a previous network address Adr-old stored in memory, the communicating element E1 then executes a communication 72 for announcing a change of network address. The announcement 72 consists of sending a message Mess1 having a specific header format. This is for example a message of the multicast type, addressed to all the communicating elements of the communication network 14 who are subscribed to a predetermined distribution group.

In the example, preferably, the distribution group is a group whose subscribed members include all the communicating elements of the communication network 14 corresponding to a group address.

The message for announcing the change of network address Mess1 includes both the new network address of the communicating element E1, Adr-new, which is its current network address, and the most recent previous address Adr-old, or a plurality of previous addresses when several previous addresses have been memorized.

In the example, it is assumed that the communicating element E2 is indeed connected to the communication network 14 and receives the message announcing the change of network address Mess1, while the communicating element E3 is temporarily disconnected or switched off, and does not receive the message announcing the change of network address Mess1.

Upon receipt of the announcement message Mess1 by the communicating element E2, the latter performs an update 74 by memorizing the current address Adr-new of the communicating element E1 as a replacement of the previous address Adr-old.

An analogous updating operation 74' is for example carried out by the router R, as well as by any communicating element connected to the communication network 14, subscribed to the predetermined distribution group and that has memorized the network address of the communicating element E1 or the data linked to the network address of the communicating element E1.

At a later time, the communicating element E3 reconnects to the communication network 14 and sends, for example, during the step 76, a point-to-point type message Mess2, containing a command, to be forwarded to the home automation equipment units corresponding to the communicating element E1, and having as the recipient's address the previous address Adr-old.

The previous address Adr-old being obsolete, the message Mess2 is not received, which is symbolised by a cross in the schematic in FIG. 5. The communicating element E3 is notified, in step 78, of the mail delivery error message Mess2, or deduces the non-delivery of the message Mess2 in the absence of acknowledgment of receipt of this message.

Then, the communicating element E3 sends during the step 80 a request for identification by previous address, in a message Mess3 of multicast type. The request for identification by previous address contains the previous address Adr-old and requests any communicating element connected to the communication network 14 that has memorized the network address Adr-old as a previous network address, to identify itself with its current network address.

Upon receipt of this message Mess3 of request for identification by previous address, each communicating element extracts the network address Adr-old from the message Mess3, compares it to the address memorized in the table 60 in the memory storage 44 and checks to verify whether the address Adr-old extracted from the message Mess3 and the memorized previous address are identical to each other.

This verification being positive for the communicating element E1, the latter sends a response during the step 82, the response being for example a message Mess4, directly addressed to the communicating element E3 in point-to-point communication, and containing the new network address Adr-new of the communicating element E1. According to one variant on implementation, the message is sent in multicast mode in order to inform all the communicating elements. This type of message may be sent when one complete branch of the communication network has been disconnected in order to avoid a multitude of requests after its reconnection.

Upon receipt of this message Mess4, the communicating element E3 extracts from the message received the new network address Adr-new and updates, during a step 84, analogous to the step 74 described here above, the new network address Adr-new of the communicating element E1.

In an alternative embodiment, a communicating element E1 acquires a new network address following a change of identifier of the sub-network SID or of the sub-sub-network SSID signaled by means of an announcement message transmitted by a router 24 or a gateway 22 at the head-end of a sub-network to which the communicating element E1 belongs.

In this embodiment of implementation, the communicating element E1 receives an announcement message signaling a change of identifier, memorizes its current network address in the table 60 as the previous network address Adr-old, and then updates its current network address Adr-new, with or without a negotiation step.

By way of a variant or as an addition, at least some part of the communicating elements of the network, for example at least the network equipment units of such type as the router 24 or gateway 22, implements a request for discovery of the previous network addresses of a set or all of the connected communicating elements, by means of sending a message in a multicast sending mode addressed to all of the communicating elements subscribed to a predetermined recipient group or in a point-to-point mode.

For example, all communicating elements are subscribed to the recipient group.

In response to a request for discovery of the previous network addresses, each communicating element subscribed to the recipient group sends, also in multicast communication mode to the predetermined recipient group, and in a message formatted in an appropriate manner, all of its memorized previous addresses.

According to one variant, only the most recent previous address is sent.

Advantageously, the mechanism for exchanging previous addresses that has been established makes it possible to simplify the updating of network addresses in the communication network 14.

The communication protocol used in the communication network 14 thus finds itself enriched with a functionality.

In another use case, when a home automation equipment unit 6, 8, 10 is replaced by a new home automation equipment unit, for example in case of failure or upgrading of the home automation equipment unit, it is useful to note the network address 50 of the replaced home automation equipment unit and to memorize it as a previous network address in the table 60 of the new home automation equipment unit at the time of its being wired to the communication network 14. Thus, integration into the communication network of the new home automation equipment unit as a communicating element of the communication network is easily done thanks to the memorizing of the previous network address of the replaced home automation equipment unit in the table 60 of the new home automation equipment unit.

The invention has been described here above more particularly in the case of a communication network arranged in the form of a hierarchical network that includes a main network comprising a common data bus and a plurality of sub-networks, organised based on at least two hierarchical levels, at least a first of the sub-networks being connected directly to the common data bus by means of a gateway, and at least a second of the sub-networks being connected to the gateway by means of a router and forming a sub-sub-network SSN having a rank lower than the first sub-network SN, in which each communicating element of the network has a network address comprising a plurality of address fields, each of the address fields being relative to at least one hierarchical level.

It is nevertheless understood that the invention is not limited to this context of operational implementation, and indeed finds application in any type of communication network in which the communicating elements connected are assigned a network address allowing for point-to-point communication.

The invention claimed is:

1. A communication method for communicating between communicating elements forming part of a home automation system for a building, each of the communicating elements being connected in a communication network that supports communication according to a predefined communication protocol, the method comprising:
   memorizing, by each of the communicating elements of the communication network, a current network address in a memory storage of the communicating element, the current network address being used for point-to-point addressing in the communication network, each of the communicating elements implementing memorizing at least one previous network address of the communicating element, in the memory storage of the communicating element; and
   sending, by a requesting communicating element, a request for identification of another communicating element of the communication network, the request for identification identifying the other communicating element by a previous network address of the other communicating element, in a message to be forwarded to a group of recipients to which a plurality of communicating elements are subscribed, the message containing at least one previous network address of the other communicating element.

2. The communication method according to claim 1, further comprising memorizing a predetermined number P of previous addresses, P representing a non-zero integer.

3. The communication method according to claim 1, further comprising the following operations that are operationally implemented by at least one of the communicating elements:
updating the current network address; and
implementing an announcement of change of network address by transmitting another message comprising at least the updated current network address and at least one previous network address of the communicating element.

4. The communication method according to claim 1, further comprising, upon receipt of the identification request by a previous network address, the following operations, implemented by at least one receiving communicating element belonging to the group of recipients:
comparing the predetermined network address with each previous network address memorized by the receiving communicating element, and
sending, to the requesting communicating element, a response message containing at least the current network address of the receiving communicating element, when the predetermined network address matches a previous network address.

5. The communication method according to claim 1, further comprising sending, by a requesting communicating element, a request for discovery of the previous network addresses, in a discovery message to be forwarded to a group of recipients to which a plurality of communicating elements are subscribed.

6. The communication method according to claim 5, further comprising sending a response message comprising at least one previous address of the communicating element, to be forwarded to all the communicating elements subscribed to the group of recipients, effectively implemented by each of the communicating elements subscribed to the group of recipients.

7. The communication method according to claim 1, wherein the communication protocol is the Internet Protocol version 6 (IPv6).

8. A communicating element belonging to a home automation system for a building, the communicating element being configured to be connected in a communication network that supports communication according to a predefined communication protocol, the communicating element comprising:
a network controller comprising a processor configured to implement program code instructions to be used in order to execute the communication method according to claim 1; and
a network interface comprising
a memory storage configured to memorize a current network address of the communicating element, the current network address being used for point-to-point addressing in the communication network, and
a table configured to memorize at least one previous network address of the communicating element.

9. The communication method according to claim 1, wherein the requesting communicating element and the other communicating element are configured to communicate based on the previous network address of the other communicating element and without knowledge by the requesting communicating element of the current network address of the other communicating element.

10. A home automation system for a building, the home automation system comprising:
a plurality of communicating elements, each of the communicating elements being configured to implement the method according to claim 1, each of the communicating elements belonging to the home automation system for a building, which is configured to be connected in a communication network that supports communication according to a predefined communication protocol, each of the communicating elements comprising
a network interface comprising
a memory storage configured to memorize a current network address of the communicating element, the current network address being used for point-to-point addressing in the communication network, and
a table configured to memorize at least one previous network address of the communicating element.

11. A communication method for communicating between communicating elements forming part of a home automation system for a building, each of the communicating elements being connected in a communication network that supports communication according to a predefined communication protocol, the method comprising:
memorizing, by each of the communicating elements of the communication network, a current network address in a memory storage of the communicating element, the current network address being used for point-to-point addressing in the communication network, each of the communicating elements implementing memorizing at least one previous network address of the communicating element, in the memory storage of the communicating element;
sending, by a requesting communicating element, a request for discovery of the previous network addresses, in a message to be forwarded to a group of recipients to which a plurality of communicating elements are subscribed; and
sending a response message comprising at least one previous address of the communicating element, to be forwarded to all the communicating elements subscribed to the group of recipients, effectively implemented by each of the communicating elements subscribed to the group of recipients.

12. The communication method according to claim 11, further comprising memorizing a predetermined number P of previous addresses, P representing a non-zero integer.

13. The communication method according to claim 11, further comprising the following operations that are operationally implemented by at least one of the communicating elements:
updating the current network address; and
implementing an announcement of change of network address by transmitting another message comprising at least the updated current network address and at least one previous network address of the communicating element.

14. The communication method according to claim 11, wherein the communication protocol is the Internet Protocol version 6 (IPv6).

15. A communicating element belonging to a home automation system for a building, the communicating element being configured to be connected in a communication network that supports communication according to a predefined communication protocol, the communicating element comprising:
- a network controller comprising a processor configured to implement program code instructions to be used in order to execute the communication method according to claim 11; and
- a network interface comprising
    - a memory storage configured to memorize a current network address of the communicating element, the current network address being used for point-to-point addressing in the communication network, and
    - a table configured to memorize at least one previous network address of the communicating element.

\* \* \* \* \*